United States Patent

[11] 3,573,420

| [72] | Inventor | Wallace C. Johnson |
| | | Wilmington, N.C. |
| [21] | Appl. No. | 786,236 |
| [22] | Filed | Dec. 23, 1968 |
| [45] | Patented | Apr. 6, 1971 |
| [73] | Assignee | Arcos Corporation |
| | | Philadelphia, Pa. |

[54] PROCESS AND APPARATUS FOR NONCONSUMABLE ELECTRODE OVERLAY WELDING
5 Claims, 13 Drawing Figs.

[52] U.S. Cl. ..................................... 219/76, 219/130
[51] Int. Cl. ..................................... B23k 9/04
[50] Field of Search ......................... 219/76, 77, 124, 125, 130

[56] References Cited
UNITED STATES PATENTS

| 1,635,217 | 7/1927 | Kirchman | 219/77 |
| 2,175,606 | 10/1939 | Kinkead | 219/76 |
| 2,175,607 | 10/1939 | Kinkead | 219/76 |
| 3,118,047 | 1/1964 | Johnson | 219/76 |
| 3,248,513 | 4/1966 | Sunnen | 219/76 |
| 3,260,834 | 7/1966 | Arnoldy | 219/130 |

Primary Examiner—J. V. Truhe
Assistant Examiner—Hugh D. Jaeger
Attorney—Jackson, Jackson and Chovanes

ABSTRACT: Electric arc overlay welding, often called arc cladding, on a metallic backing, which in many cases is of steel. A barrier strip rests on the backing and a nonconsumable electrode arcs to the barrier strip. In one form of the invention the nonconsumable electrode oscillates back and forth across the barrier strip as it moves forward and in some cases it goes beyond the barrier strip and arcs to a previous weld bead beside the barrier strip. In one form of the invention the barrier strip is of green or unsintered compacted metal particles. The barrier strip may contain flux and it may contain deoxidizer.

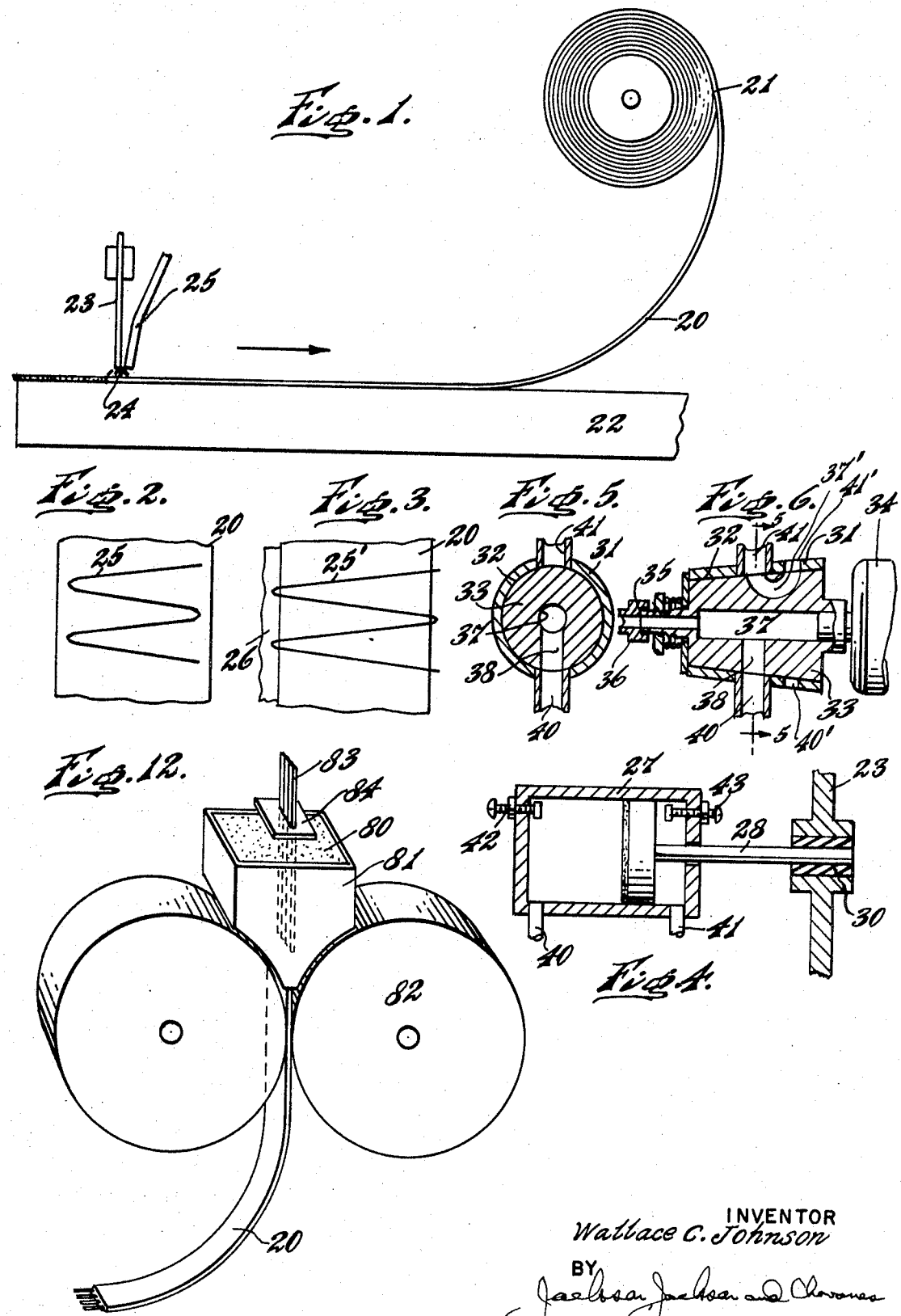

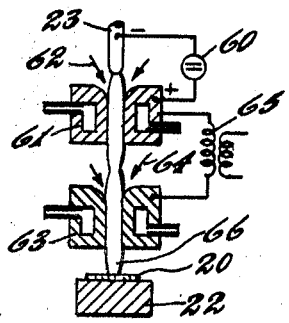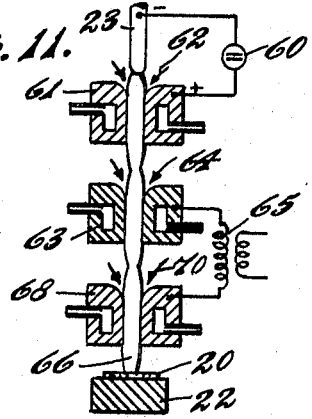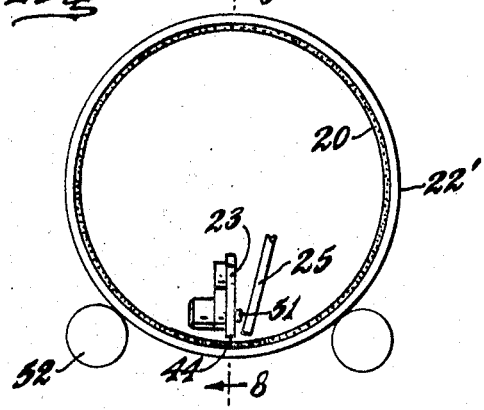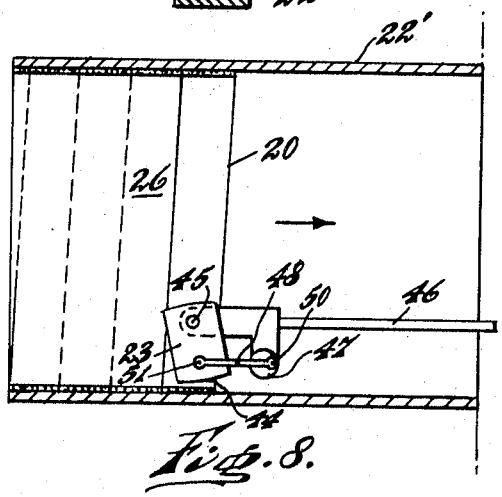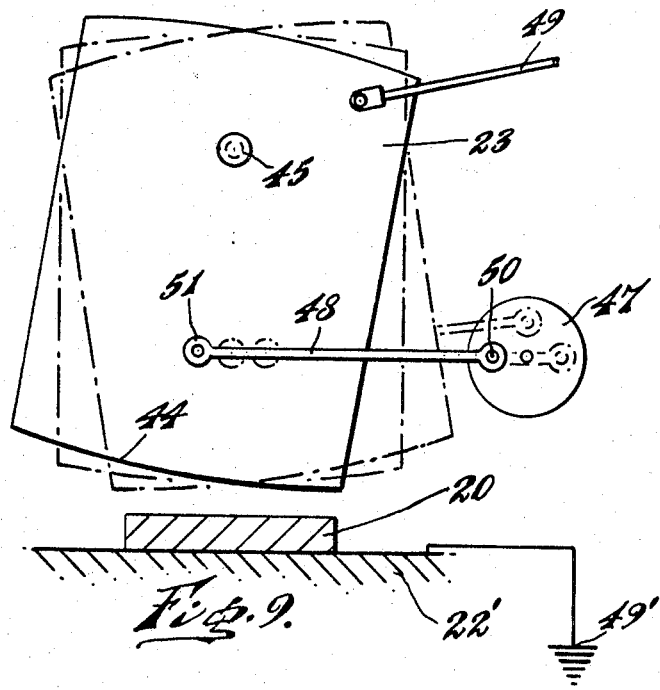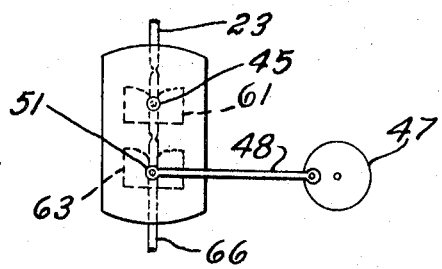

PROCESS AND APPARATUS FOR NONCONSUMABLE ELECTRODE OVERLAY WELDING

DESCRIPTION OF INVENTION

The present invention relates to electric arc overlay welding, often called arc cladding, on a metallic backing, often a steel backing.

A purpose of the invention is to lay down a barrier strip against the backing and to melt the barrier strip and the adjoining metal of the backing by an arc from a nonconsumable electrode, the electrode moving forward longitudinally of the barrier strip and also oscillating laterally of the barrier strip.

A further purpose when using an adjoining weld bead is to oscillate the nonconsumable electrode so as to arc also to the adjoining weld bead and thus obtain a sound junction between the new weld bead and the old.

A further purpose is to provide a nonconsumable electrode such as a short piece of tungsten sheet which oscillates with respect to a barrier strip, the electrode having a curved surface adjoining the barrier strip which protrudes toward the barrier strip near the middle, the electrode being pivoted and oscillated in the direction of its width to bring various parts of the electrode into closest proximity to the barrier strip.

A further purpose is to permit overlay welding in spaces which are too small to permit practical use of a consumable electrode arc, by employing an arc from a nonconsumable electrode which moves so as to melt the entire width of the barrier strip as the arc progresses forward.

A further purpose is to melt a green or unsintered compacted barrier strip of metal particles resting on a backing by a nonconsumable electrode arcing to the barrier strip and thus obtain the advantage of rapid melting because of the relatively great surface of the individual particles exposed to the arc.

A further purpose is to melt a green or unsintered compacted barrier strip of metallic particles by arching from a nonconsumable electrode and secure close conformity of the barrier strip to the surface of the backing because of the flexibility and compliance of the barrier strip.

A further purpose is to employ a relatively dense barrier strip having an open porosity of between 5 percent and 45 percent, and preferably between 10 percent and 30 percent, and to melt this barrier strip by an arc from a nonconsumable electrode, thus avoiding the difficulty in controlling the position of loose barrier particles which otherwise might be employed.

A further purpose is to permit the depositing of thinner layers of cladding metal on a backing than would be possible when a consumable arc is used with a barrier strip.

A further purpose is to aid in repair welding such as building up stainless steel surfaces on mixers and valve seats.

A further purpose is to employ a relatively nonconsumable electrode of tungsten or of carbon.

A further purpose is to melt the barrier strip by a plasma produced by an arc to a nonconsumable electrode.

Further purposes appear in the specification and in the claims.

In the prior art extensive use has been made of overlay welding from a consumable electrode arcing to a barrier strip resting against a metallic backing. There are, however, certain limitations in this process. Space requirements must be adequate to provide a consumable arc for overlay welding in this manner. Difficulty is encountered in depositing a very thin overlay deposit because of the inherent relatively large melting rate from the electrode plus the barrier strip.

In Kinkead U.S. Pat. No. 2,175,607 loose particles are melted by a carbon arc for overlaying.

In making welded joints a nonconsumable arc has been used with a lay-in strip in Lincoln U.S. Pat. No. 1,684,181; Gayley U.S. Pat. No. 2,826,671; Mabry U.S. Pat. No. 3,288,981; Jerabek U.S. Pat. No. 1,884,712; Jerabek U.S. Pat. No. 1,884,714 and Lincoln U.S. Pat. No. 1,826,355.

In Connoy et al. U.S. Pat. No. 3,089,945 and Anderson U.S. Pat. 2,778,099 a lay-in strip is fed at an angle to the backing and melted by an arc from a nonconsumable electrode.

In Johnson U.S. Pat. No. 3,246,115 a lay-in rod is melted to form a welded joint by means of a plasma torch.

I have discovered that for certain types of overlay welding on metallic backing, including thin deposits, and those formed in cramped spaces, there are distinct advantages in arcing to a barrier strip lying against the metallic backing from a nonconsumable electrode such as a tungsten electrode permissibly producing a plasma, and oscillating the electrode so as to provide complete melting of the barrier strip and fusion of the adjoining portion of the base as the electrode moves longitudinally forward.

I have also discovered that it is very advantageous in using an arc from a nonconsumable electrode to employ a green or unsintered compacted barrier strip of metallic particles, thus gaining the advantage of flexibility and flatness of the barrier strip against the backing and also of rapid melting because the particles are more completely exposed to the arc than in the case of a wrought dense barrier strip.

The principles of the invention can be employed using the technique of TIG welding in which the nonconsumable electrode produces an arc which is protected from the atmosphere by a protective gas, suitably an inert gas of the character of argon or helium, or carbon dioxide in the case of welding steel and similar alloys. Also the weld can be protected by a flux as in submerged arc welding, due care being taken to avoid excess of flux. This flux can be added as a loose granular material to cover the weld tightly. Also where desired, flux or flux ingredients can be introduced as part of the green or unsintered compacted barrier strip of metal particles.

In the drawings I have chosen to illustrate a few only of the numerous embodiments in which the invention may appear, selecting the forms shown from the standpoints of convenience in illustration, satisfactory operation and clear demonstration of the principles involved.

FIG. 1 is a diagrammatic side elevation of a welding machine employing the principles of the invention.

FIG. 2 is a fragmentary diagrammatic plan view of a barrier strip showing the locus of motion of the nonconsumable electrode.

FIG. 3 is a fragmentary diagrammatic plan view of a barrier strip and a portion of an adjoining weld bead, showing a variation in the locus of progression of the nonconsumable electrode.

FIG. 4 is a diagrammatic section showing the cylinder for manipulating the nonconsumable electrode.

FIG. 5 is a diagrammatic transverse section of the line 5-5 of FIG. 6 showing a valve for controlling the cylinder of FIG. 4.

FIG. 6 is a diagrammatic axial section of the valve of FIG. 5.

FIG. 7 is a diagrammatic end elevation showing overlaying inside a tube or pipe, using the principles of the invention.

FIG. 8 is a diagrammatic section on the line 8-8 of FIG. 7.

FIG. 9 is an enlarged diagrammatic fragment of FIG. 8 illustrating the manipulation of the electrode.

FIGS. 10 and 11 are diagrammatic axial sections of plasma jets embodying the principles of the invention.

FIG. 10a is a diagrammatic side elevation similar to FIG. 10 showing the oscillation of the plasma jet following FIG. 9.

FIG. 12 is a fragmentary diagrammatic perspective showing the production of a barrier strip in accordance with the invention.

As shown in FIG. 1, a barrier strip 20 suitably supplied from a reel 21 is laid down against a metallic backing 22 as the welding machine advances. Advancing with the welding machine is a nonconsumable electrode 23 which may for example be of tungsten or where suitable of carbon. A source of welding current connected to the nonconsumable electrode and to the metallic backing provides an arc 24 between the electrode and the barrier strip. The weld is surrounded by a protecting gas from a tube 25, which is intended to illustrate diagrammatically any suitable means for introducing and enclosing the gas.

Thus the electrode is continuously moving forward longitudinally of the barrier strip as the weld progresses. At the same time, the electrode oscillates back and forth widthwise of the barrier strip as suggested by the path 25 in FIG. 2, and preferably follows a path 25' as shown in FIG. 3 in which it extends in its oscillation beyond the barrier strip 20 to arc to and melt a portion of the adjoining edge of the previous weld bead 26 so as to assure adequate bond and freedom from inclusions between the previous weld bead and the new weld bead.

To accomplish the lateral oscillation or scanning of the barrier strip, the mechanism shown is intended to be diagrammatic and to illustrate any suitable drive, whether electric, mechanical, fluid or otherwise. A pneumatic cylinder 27 having a piston and piston rod 28 may accomplish the oscillation as shown in FIG. 4, the piston rod supporting a nonconsumable electrode 23 by a suitable insulating support 30. A valve 31 shown in FIGS. 5 and 6 has a housing 32 and a rotating valve member 33 rotated by a drive 34. At the center of one end a port 35 in the housing introduces compressed air by a rotating joint 36 into an axially extending passage 37 in the valve. A radial port 38 in the valve is at one time in contact with connection 40 in the housing which connects to one end of the cylinder and at another time in contact with connection 41 in the housing which connects to the opposite end of the cylinder. Exhaust is through valve port 37' to exhaust ports 40' or 41' in the valve casing, valve port 37' being opposite to valve port 38. Thus the piston is made to reciprocate back and forth carrying with it the nonconsumable electrode 23 in a direction to scan the barrier strip. In order to adjust the width of the motion, adjustment screws 42 and 43 in opposite ends of the cylinder are provided to control the stroke.

FIGS. 7 to 9 show a pipe 22' which is being overlaid on the inside. A barrier strip 20 taking a circular or preferably a helical path on the inside of the pipe is fused by a longitudinally moving and laterally scanning nonconsumable electrode 23, suitably of tungsten. The electrode in this case is of sheet form, the long lateral dimension extending widthwise of the barrier strip. The electrode has a curvature 44 on the edge adjoining the barrier strip so that the middle portion protrudes toward the barrier strip when the electrode strip is in midposition. The nonconsumable electrode is pivoted at 45 from an electrically insulating beam 46 so that it can swing into opposite limiting positions to cause the arc to move back and forth across the barrier strip as the electrode moves forward longitudinally of the barrier strip. Electrical connection to the electrode is made by a lead 49 and the backing metal is grounded at 49'. The swinging motion is provided by a crank 47 driven by a suitable drive supported on the beam. A connecting rod 48 is pivotally connected at 50 to the crank and at 51 to the barrier strip. The pipe is turned by rollers 52 which are driven rotationally and are set at an angle with respect to the axis of the pipe so as to make the rotational path follow longitudinally the spiral path of the barrier strip. Gas for protecting the weld is provided by a gas tube 25 or otherwise.

Since the electrode of FIGS. 7 to 11 constantly changes its point of arching, it remains cooler and is subject to less wear.

It will be evident that a usual TIG torch or a plasma torch with a transferred arc may be used if desired.

In some cases instead of using a nonconsumable arc of the TIG type, a plasma jet from a nonconsumable arc may be used as shown in Sunnen U.S. Pat. No. 3,205,338. Thus as shown in FIG. 10, a direct current source 60 is connected to a nonconsumable, suitably tungsten, electrode 23, which is suitably of solid form, and to a hollow electrode 61 suitably of tungsten. In the preferred form the negative pole is connected to the solid electrode and the positive pole is connected to the hollow electrode.

Water cooling passages are provided in the hollow electrode and water is passed through them in order to cool it. A jet of gas is projected as indicated by arrows 62. In line with the axis of the hollow electrode 61 is provided a second hollow electrode 63, suitably of tungsten, having passages for water cooling. A jet of gas is projected as indicated by arrows 64. A source of alternating current, suitably from a transformer 65, is connected to the hollow electrode 61 and to the hollow electrode 63. It is intended that the energy introduced by the alternating current will be much in excess of that provided by the direct current as explained in the Sunnen patent aforesaid. A final plasma 66 is projected against the barrier strip 20. The plasma torch as shown in FIG. 10 is capable of being oscillated back and forth as shown in FIG. 10a.

In FIG. 11 I show a modification of the plasma torch also according to the Sunnen patent. In this form an additional coaxial hollow electrode 68, suitably of tungsten, is provided and the source of alternating current is connected to the hollow electrodes 63 and 68, so that the alternating current and direct current are not connected to the same hollow electrode. A stream of gas is projected as shown by arrows 70. The device of FIG. 11 may also be oscillated. The alternating current may be of commercial frequency. A transferred arc plasma torch or a TIG welding torch may be used instead.

One of the advantages of using powder metal strip in green or unsintered compacted form as a barrier strip is that it is relatively easy to get it to conform to the contour of the metallic backing because the strip is relatively flexible, unlike many wrought strips.

Such a powder metal strip also has an advantage if a steel metallic backing is receiving an overlay for example of stainless steel or the like it is possible to bring in with the barrier strip a substantial amount of air, as the barrier strip can have a porosity of say 5 to 45 percent. This air tends to oxidize carbon and since the amount is controlled this is an effective way of keeping the carbon low in the overlay without the danger of oxidizing the weld. Another way nickel do this is to incorporate an oxide such as ferric oxide in the strip. In FIG. 12 I illustrate the manufacture of a barrier strip suitable for the invention. Powder metals 80 from a hopper 81 are fed into the bite of compressing rollers 82 which are fed forward to create a barrier strip 20. In order to strengthen the strip while keeping it flexible, longitudinal strengthening elements 83 are fed through a guide 84 and become embedded in the interior of the strip. These may be wires or fibers, for example of plain carbon or stainless steel or nickel where appropriate with respect to the composition of the strip, or they may be nonmetallic or organic plastic fibers such as nylon (linear polyamide) or polyfluorocarbon such as polytetrafluoroethylene (Teflon) or the copolymer of tetrafluoroethylene and 5 to 35 percent by weight of hexafluoropropylene (Teflon FEP) or monochlorotrifluoroethylene (Kel-F), or they may be glass.

Such a barrier strip can be made in a thickness range of 0.030 to 0.187 inch and preferably in a thickness of 0.090 to 0.125 inch. The barrier strip can be effectively made in widths of between one half and 6 inches and greater and preferably between three fourths inch and 3 inches, a desirable width being about 1½ inches. A substantial quantity of deoxidizer may be included in the powder metal barrier strip as this aids in preventing adherence of slag.

The following lists examples of barrier strip compositions which may be used according to the inventor to obtain sound overlays using a tungsten electrode with oscillation of the electrode on a backing of AISI 1020 carbon steel:

| Example | Experiment | Composition |
| --- | --- | --- |
| 1 | 16322 | 20% Cr, 10% Ni, 2% Mn, 1% Al, balance Fe. |
| 2 | 16339 | Stellite 6, C 0.7 to 1.14%, Mn 2% max. Cr 26 to 32%, W 3 to 6%, Ni 3% max., other 4.5% max., Co remainder. |
|   |   | Stellite 6%, CO. 7 to 0.14%, Mn 2% max., N 3 to 6% Ni 3% max., Si 2% max., other 0.5 max., Co remainder. |
| 3 | 16348 | 25% Cr, 12.5% Ni, 2% Mn, 1% Al, balance Fe. |
| 4 | 16446 | 20% Cr, 9% Ni, balance Fe plus small amounts of Mn and Al. |
| 5 | 16574 | 24% Cr, 13% Ni, Type 309 L stainless steel. |
| 6 | 16608 | Type 316 stainless steel. |
| 7 | 16647 | 28% Cr, 13% Ni, balance Fe. |
| 8 | 16668 | 35% Cr, 15% Ni, 30% Mn, 1% Al, balance Fe. |
| 9 | 16691 | 20.8% Cr, 9.9% Ni, 0.6 Nb, balance Fe. |
| 10 | 16716 | Monel (Cu, Ni). |
| 11 | 16806 | 40% Cr. 20% Ni, balance Fe. |
| 12 | 16812 | 35% Cr, 17% Ni, balance Fe. |
| 13 | 16845 | 41% Cr, 16% Ni, 3% Mn, 1% Al, 39% Fe. |
| 14 |   | 15% Cr, 3% Ni, 3% Mo, balance iron. |
| 15 |   | 28% Cr, 3% C, balance iron. |
| 16 |   | 2.5% Cr, 3% Ni, 3% Mo, balance iron. |

The following flux is rendered free parting by an inclusion of deoxidizer in the barrier strip, whereas otherwise it clings to a stainless steel or similar weld:

|  | Percent |
|---|---|
| Calcium silicate | 30-60 |
| Mullite | 5-20 |
| Flourspar | 2-10 |
| Cryolite | 0-10 |
| Zirconium silicate | 0-20 |

The following table shows flux compositions which can be made to part by inclusion of deoxidizer:

|  | Neutral flux | Neutral flux | Chromium enriched fluxes | |
|---|---|---|---|---|
| Calcium silicate | 54 | 78 | 43 |  |
| Mullite | 16 | 10 | 14 | 20 |
| Zirconium silicate | 16 |  | 14 |  |
| Fluorspar | 7 | 8 | 6 | 32 |
| Bentonite clay | 2 | 2 | 2 | 2 |
| Cryolite | 5 |  | 4 |  |
| Ferrochromium |  |  | 15 | 13 |
| Electrolytic manganese |  | 2 | 2 | 3 |
| Alumina |  |  |  | 30 |

The following deoxidizers may be used in the barrier strip up to 6 percent total:

|  | Percent |
|---|---|
| Aluminum | 0.5-5 |
| Manganese | 0.5-5 |
| Calcium | 0.05-2 |
| Silicon | 0.25-2 |
| Titanium | 0.25-2 |
| Magnesium | 0.25-3 |
| Lanthanum | 0.10-0.60 |
| Cerium | 0.10-0.60 |
| Boron | 0.05-0.20 |
| Lithium | 0.20-0.5 |

The quantity of flux to be included in the barrier strip may range between one half percent and 20 percent, and the total quantity of deoxidizer which may be included in the barrier strip may range between one tenth percent and 6 percent.

Where the barrier strip is to be of stainless steel a satisfactory composition has been found to be as follows by weight:

|  | Percent |
|---|---|
| Ferrochrome (70% chromium) | 34 |
| Nickel | 10 |
| Manganese | 2 |
| Aluminum | 1 |
| Iron | balance |

Thus it will be evident that the use of a green or unsintered compacted powder metal barrier strip aids in melting the barrier strip by the nonconsumable arc because the particles in melting are exposed to the arc over a larger surface than in the case of melting a wrought solid barrier strip.

EXAMPLE 17

A heat exchanger pipe of Type 304 stainless steel has an internal diameter of about 12 inches. A barrier strip having a composition conforming to Type 309 stainless steel placed spirally inside the pipe as the welding progresses is melted by an oscillating arc from a tungsten electrode under 500 amperes direct current. The strip used is 1½ inches wide and has a thickness of 0.064 to 0.080 inch. A continuous thin overlay is obtained free from defects which affect the integrity of the overlay.

EXAMPLE 18

The procedure of example 17 is carried out in larger pipe using a green or unsintered compacted powder metal barrier strip of Type 304 stainless steel, a plasma torch being used to melt the barrier strip, the torch being oscillated back and forth as it moves forward. A sound overlay is obtained.

EXAMPLE 19

The procedure of example 17 is carried out except that the green or unsintered barrier strip incorporates 10 percent of calcium fluoride or cryolite as a flux, and 3 percent of aluminum powder as a deoxidizer. The flux alters the surface tension making the weld more effectively wet the steel base, and also gives some protection to the surface of the weld against oxidation.

EXAMPLE 20

The procedure of example 19 is carried out except that the plate is painted in advance with lithium oxide flux, the water used as a vehicle being allowed to dry before welding. The paint is applied after sand blasting the plate. More rapid adhesion is obtained.

The percentages herein are all percentages by weight except the percentages of porosity.

It will be evident that the torch of the invention as it progresses longitudinally and normally oscillates laterally, melts all of the barrier strip along with the adjoining edge of the previous weld bead and a portion of the backing metal to make the weld pool.

It will also be evident that in many cases multiple welding torches or plasma torches can operate in the same installation, either on the same or on parallel barrier strips, in order to accomplish overlay welding more rapidly. The multiple heat sources can be oscillated in unison or according to any predetermined relation with one another.

In view of my invention and disclosure, variations and modifications to meet individual whim or particular need will doubtless become evident to others skilled in the art, to obtain all or part of the benefits of my invention without copying the process and apparatus shown, and I, therefore, claim all such insofar as they fall within the reasonable spirit and scope of my claims.

I claim:

1. A process of electric arc overlay welding on a metallic backing, which has on the backing a previous weld bead, which comprises laying down a metallic barrier strip constituting a separate individual structure and lying against the metallic backing, and lying beside the previous weld bead, arching to the barrier strip and to the previous weld bead from a nonconsumable electrode to form a weld pool of metal from the barrier strip, metal from the metallic backing, and metal from the edge of the previous weld bead, moving the nonconsumable electrode back and forth sidewise of the barrier strip, and over the edge of the previous weld bead, and relatively advancing the nonconsumable electrode lengthwise of the barrier strip.

2. A process of claim 1, in which the barrier strip is a flexible strip of green or unsintered compacted powder metal which is in close conformity to the surface of the backing.

3. A process of claim 2, in which the barrier strip contains flux.

4. A process of claim 2, in which the barrier strip contains deoxidizer.

5. A process of claim 1, which comprises projecting a plasma from the nonconsumable electrode toward the barrier strip.

UNITED STATES PATENT OFFICE
CERTIFICATE OF CORRECTION

Patent No. 3,573,420  Dated April 6, 1971

Inventor(s) Wallace C. Johnson

It is certified that error appears in the above-identified paten and that said Letters Patent are hereby corrected as shown below:

Column 1, line 36, "arching" should read -- arcing --. Column 4, line 30, "nickel" should read -- to --; line 62, "1.14%" should read -- 1.4% --; line 64, cancel the second Stellite 6 composition in its entirety. Column 5, line 7, "flourspar" should read -- fluorspar --.

Signed and sealed this 24th day of August 1971.

(SEAL)
Attest:

EDWARD M.FLETCHER,JR.  WILLIAM E. SCHUYLER, JR
Attesting Officer  Commissioner of Patents